United States Patent
Wu et al.

(10) Patent No.: US 7,590,342 B2
(45) Date of Patent: Sep. 15, 2009

(54) METHOD AND STRUCTURE FOR SUPPRESSING RESPONSE TIME OF LENS FOCUSING STRUCTURE

(75) Inventors: Fu-Yuan Wu, Yangmei Taoyuan (TW); Chao-Ting Fan, Yangmei Taoyuan (TW)

(73) Assignee: TDK Taiwan Corp., Taipei (TW)

( * ) Notice: Subject to any disclaimer, the term of this patent is extended or adjusted under 35 U.S.C. 154(b) by 275 days.

(21) Appl. No.: 11/654,534

(22) Filed: Jan. 18, 2007

(65) Prior Publication Data

US 2008/0175578 A1    Jul. 24, 2008

(51) Int. Cl.
G02B 7/04 (2006.01)
G02B 7/02 (2006.01)
G03B 17/00 (2006.01)

(52) U.S. Cl. .................. 396/144; 396/529; 348/345; 359/823

(58) Field of Classification Search .................. 396/144, 396/529, 533, 535; 348/345, 373, 374; 359/684, 359/693, 698, 705, 808, 819, 822, 823, 826, 359/829
See application file for complete search history.

(56) References Cited

U.S. PATENT DOCUMENTS

2007/0047942 A1 * 3/2007 Chang et al. ................. 396/133

* cited by examiner

*Primary Examiner*—Rochelle-Ann J Blackman
(74) *Attorney, Agent, or Firm*—Rosenberg, Klein & Lee

(57) ABSTRACT

A lens focusing structure includes a movable mechanism having at least one base, which has a camera lens centered therein and a winding externally wound therearound; an immovable mechanism having at least a frame with magnetic members mounted to four sides thereof, a front cover, and a rear cover, and the movable mechanism being centered in the frame; and at least one shock-absorbing element connected to and between the movable and the immovable mechanism for absorbing jitters produced by the movable mechanism when the latter is displaced to a focused point and then stopped, so as to suppress dynamic response time of the movable mechanism for going from a moving state back to a still state.

13 Claims, 7 Drawing Sheets

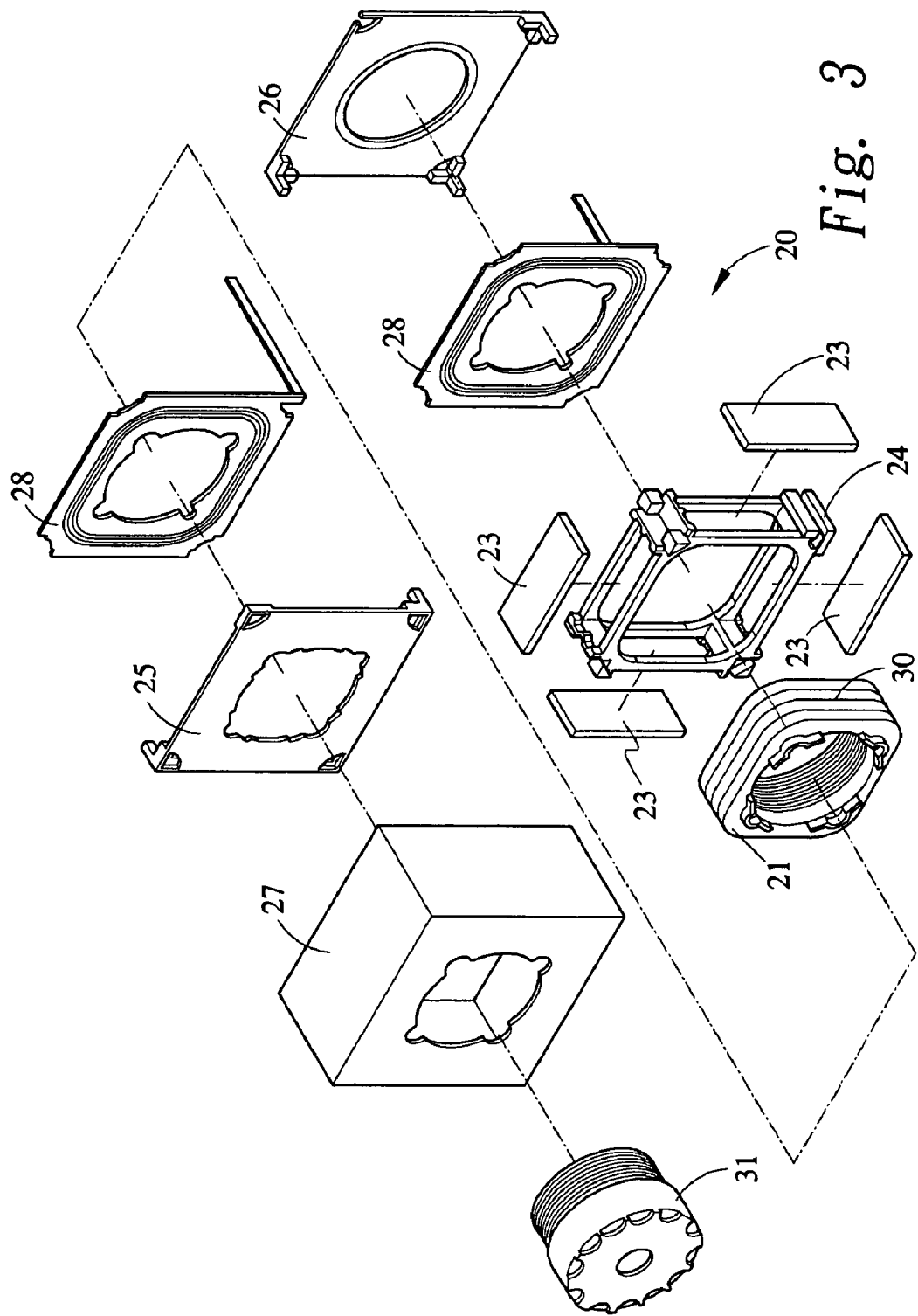

METHOD AND STRUCTURE FOR SUPPRESSING RESPONSE TIME OF LENS FOCUSING STRUCTURE

FIELD OF THE INVENTION

The present invention relates to a method and structure for suppressing response time of lens focusing structure, and more particularly to a method and structure that is able to absorb jitters produced by a micro camera lens during focusing operation thereof, so as to suppress the dynamic response time of the lens and allow the lens to quickly go from a moving state back to a still state.

BACKGROUND OF THE INVENTION

Thanks to the advanced technologies and the modularized and miniaturized camera lenses, digital cameras may now have a largely reduced volume, and most of the currently available mobile phones may have a built-in digital camera to form the so-called camera phone. In the miniaturized camera lens module, an auto-focusing structure is provided. There are various types of auto-focusing structures for the modularized and miniaturized camera lens. Among others, a voice coil motor (VCM) has the advantages of small volume, low power consumption, accurately actuated displacement, and low price, and is very suitable for use as a short-distance actuator in the auto-focusing structure of the miniaturized camera lens.

FIG. 1 is an exploded perspective view of a conventional lens focusing structure used in a camera. As shown, the lens focusing structure includes a front cover 10, a rear cover 11, an outer frame 12 being provided at four inner wall surfaces with a magnet 13 each, an internally threaded lens holder 14 for a lens 15 to screw thereinto, a winding 16 wound around an outer side of the lens holder 14, and two plate springs 17 separately connected to a front and a rear end of the lens holder 14. The lens holder 14 is supported by the two plate springs 17 to axially movably locate in the outer frame 12 and be surrounded by the four magnets 13. When the winding 16 is supplied with an amount of current to thereby produce a magnetic field polarity, the lens holder 14 and the four magnets 13 mutually repulse or attract to thereby produce a push force against the lens holder 14. At this point, the lens holder 14 connected to the outer frame 12 via the plate springs 17 is allowed to displace forward until it reaches a point to focus.

An auto-focusing camera lens would inevitably jitter when the lens holder thereof is displaced to a focused point and then stopped. The jittering camera lens then gradually becomes stabilized. The amount of time required by the camera lens to go from still to moving and back to still again is referred to as dynamic response time. FIG. 2 shows a dynamic response waveform as detected from a conventional focusing structure. It can be seen from FIG. 2, the conventional focusing structure requires a considerably long time of 1.34035 seconds to go back to a still state again.

The dynamic response time has influence on the time required by a camera lens module to complete focusing, and is therefore an important factor having great influence on the quality of the camera lens module. The longer the dynamic response time is, the longer the time is required for focusing. When it is desired to effectively improve the focusing time, the dynamic response time must be shortened.

It is therefore tried by the inventor to develop a method and structure for suppressing the dynamic response time of lens focusing structure, so as to shorten or even eliminate the dynamic response time.

SUMMARY OF THE INVENTION

A primary object of the present invention is to provide a method and structure for suppressing response time of lens focusing structure. With the method and structure, jitters produced by a camera lens when the same is displaced to a focused point, and then stopped may be absorbed, so as to suppress the dynamic response time of the camera lens to upgrade the camera focusing quality and reduce power consumed by the camera during focusing.

To achieve the above and other objects, the method of the present invention includes the step of forming between a movable mechanism and an immovable mechanism of a camera lens focusing structure with at least one receiving space for receiving at least one shock-absorbing element therein, such that the at least one shock-absorbing element is connected to and between the movable mechanism and the immovable mechanism to absorb jitters produced by the movable mechanism when the same is displaced to a focused point and then stopped, and thereby suppress the dynamic response time of the movable mechanism.

And, to achieve the above and other objects, the structure according to the present invention includes a movable mechanism, an immovable mechanism, and at least one shock-absorbing element. The movable mechanism has at least one base, which has a camera lens centered therein and a winding externally wound therearound. The immovable mechanism has at least a frame with magnetic members mounted to four sides thereof, a front cover, and a rear cover, and the movable mechanism is centered in the frame. The at least one shock-absorbing element is connected to and between the movable and the immovable mechanism for absorbing jitters produced by the movable mechanism when the latter is displaced to a focused point and then stopped, so as to suppress dynamic response time of the movable mechanism for going from a moving state back to a still state.

To achieve the above and other objects, the structure of the present invention further includes at least one elastic element, which includes a movable section connected to the movable mechanism and an immovable section connected to the immovable mechanism; and the at least one shock-absorbing element is connected to and between the movable section of the elastic element and the immovable mechanism, so as to absorb jitters produced by the movable mechanism when the latter is displaced to a focused point and then stopped, and thereby suppresses dynamic response time of the movable mechanism for going from a moving state back to a still state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is a front exploded perspective view of a lens focusing structure according to a preferred embodiment of the present invention;

DETAILED DESCRIPTION OF THE PREFERRED EMBODIMENTS

Figure 1:
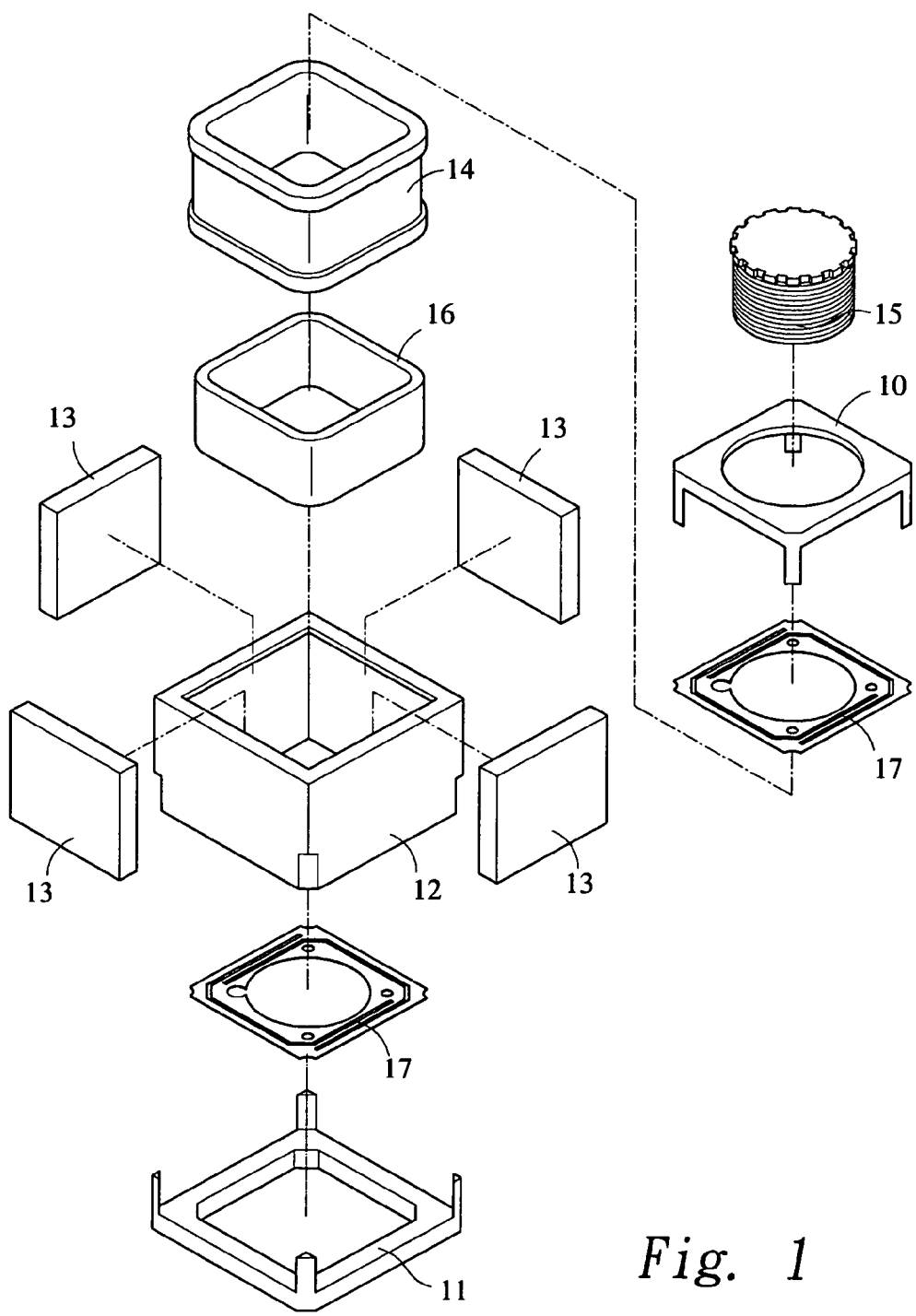
FIG. 1 is an exploded perspective view of a conventional lens focusing structure.
Figure 2:
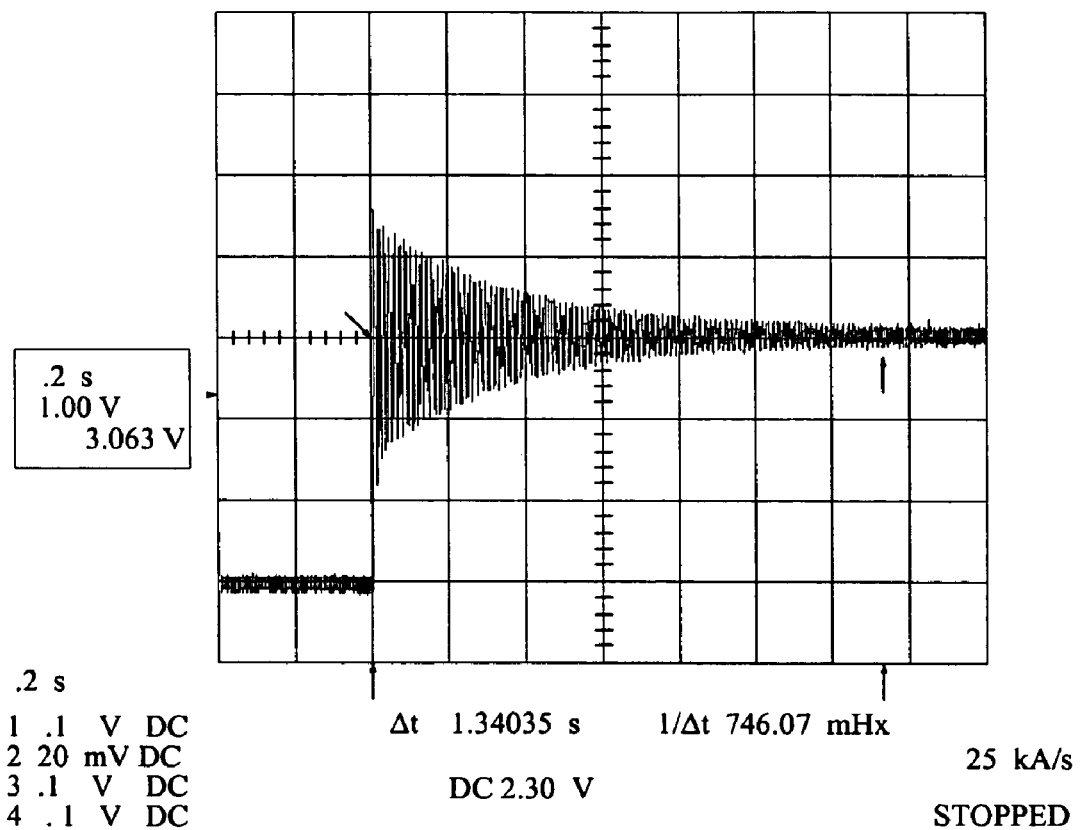
FIG. 2 shows a dynamic response waveform detected from the conventional lens focusing structure of FIG. 1.
Figure 4A:
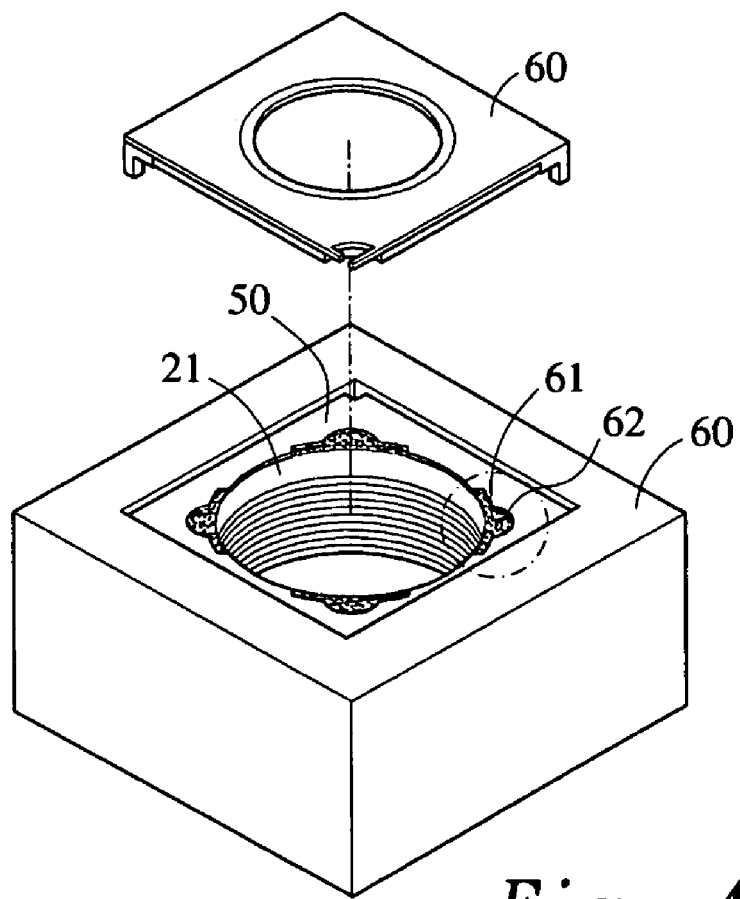
FIG. 4A is a rear assembled perspective view of FIG. 3 with a camera lens removed therefrom.
Figure 4B:
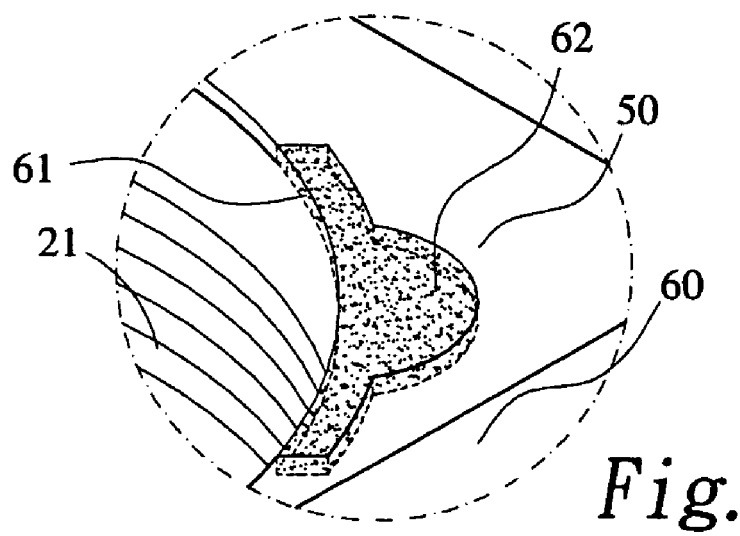
FIG. 4B is an enlarged view of the circled area of FIG. 4A.

The present invention is designed to suppress the dynamic response time of a lens focusing structure, and will now be described in more details based on a camera lens focusing structure. Please refer to FIGS. 3 and 4A that are exploded and assembled perspective views, respectively, of a camera lens focusing structure 20 according to a preferred embodiment of the present invention, and to FIG. 4B that is an enlarged view of the circled area of FIG. 4A. As shown, the camera lens focusing structure 20 of the present invention includes a base 21, a plurality of magnetic members 23, a frame 24, a front cover 25, a rear cover 26, a housing 27, and a plurality of elastic elements 28. The base 21 includes a winding 30 externally wound therearound, and internally receives a centered lens 31. The base 21 is mounted and centered in the frame 24, and the magnetic members 23 are mounted to four sides of the frame 24 to locate around the winding 30 with a predetermined fixed distance left between the winding 30 and the magnetic members 23 for producing an electric field.

The elastic elements 28 are made of an electrically conducting material and separately located between the frame 24 and the rear cover 26 and the frame 24 and the front cover 25. The housing 27 encloses all the above-mentioned parts therein with the lens 31 exposable to an outer space according to actual need.

Figure 5:
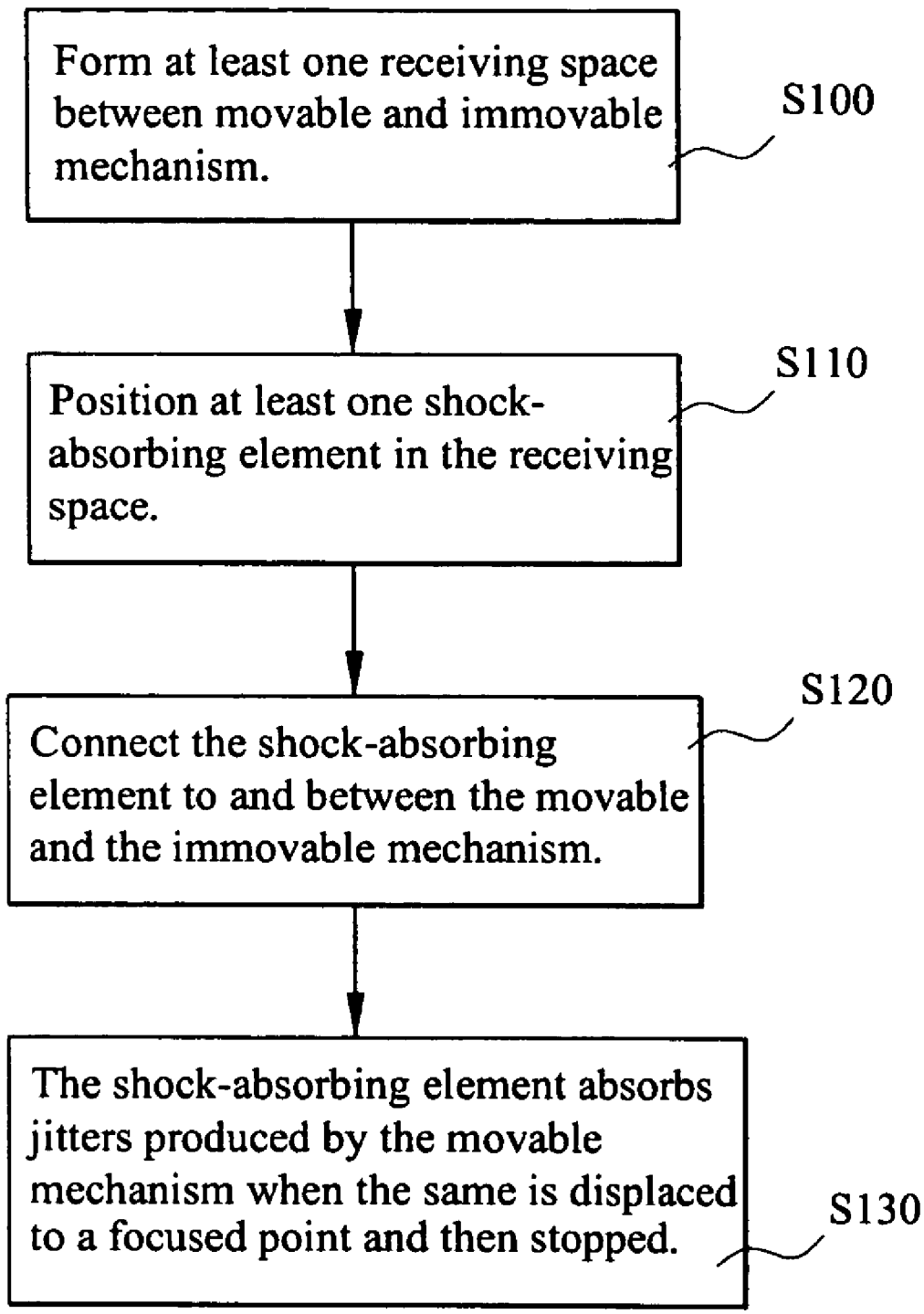
FIG. 5 is a flowchart of a method of the present invention for suppressing dynamic response time of lens focusing structure.

FIG. 5 is a flowchart of a method of suppressing response time of lens focusing structure according to the present invention. Please refer to FIG. 5 along with FIGS. 4A and 4B. In the camera lens focusing structure 20 according to the present invention, the base 21 is movable and is defined as a movable mechanism 50, while all other parts are immovable and collectively defined as an immovable mechanism 60. In the method of the present invention, at least one receiving space 61 is formed between the movable mechanism 50 and the immovable mechanism 60 (S100), and at least one shock-absorbing element 62 is provided in the at least one receiving space 61 (S110), such that the shock-absorbing element 62 is connected to the movable mechanism 50 and the immovable mechanism 60 (S120) to absorb jitters produced by the movable mechanism 50 when the same is displaced to a focused point and then stopped (S130), and thereby suppresses the dynamic response time of the movable mechanism 50.

Figure 6A:
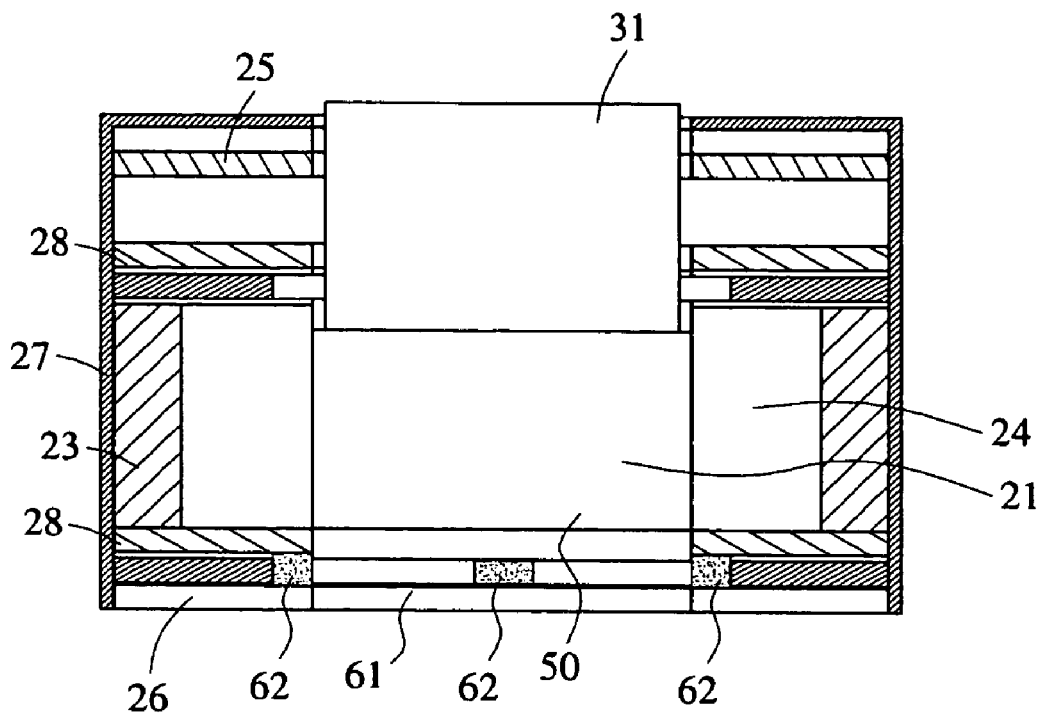
FIGS. 6A and 6B are sectioned side views showing the operation of a lens focusing structure provided with shock-absorbing elements according to the present invention.
Figure 6B:
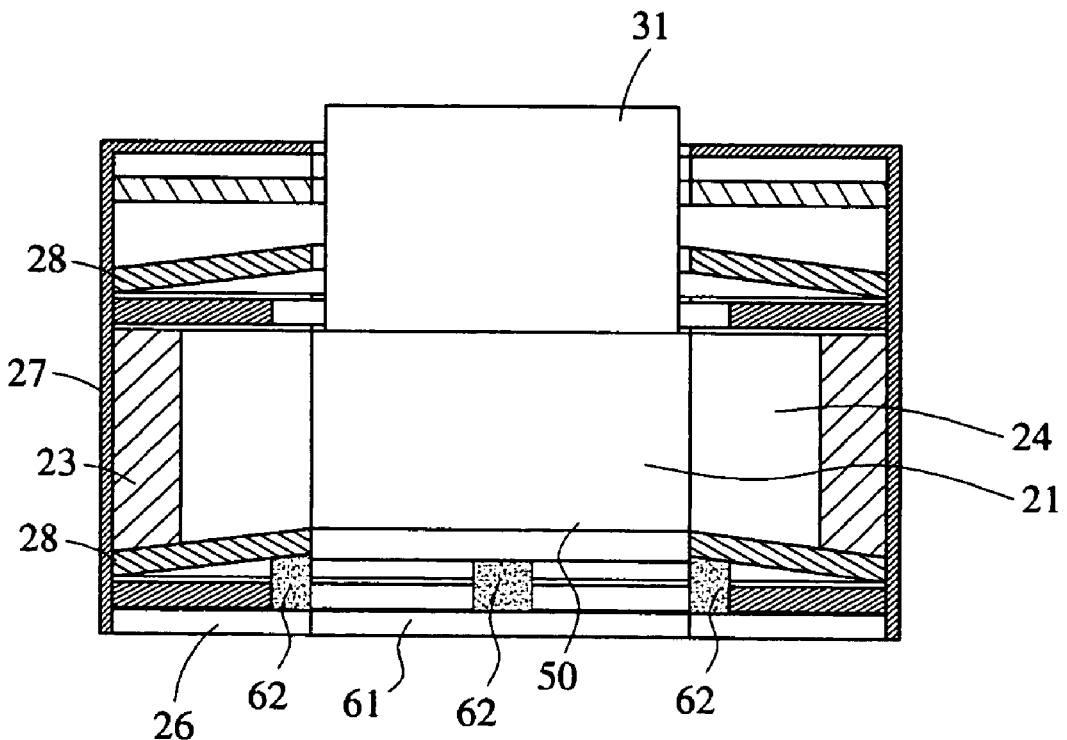

FIGS. 6A and 6B are sectioned side views showing the operation of the camera lens focusing structure 20 with at least one shock-absorbing element 62. Please refer to FIGS. 6A and 6B along with FIGS. 4A and 4B. The shock-absorbing element 62 has one side attached to an inner side of the rear cover 26, and another opposite side attached to a rear side of the base 21. The shock-absorbing element 62 may be a shock-absorbing material or member, such as a soft gel, a soft spring, or a soft rubber material. The shock-absorbing element 62 may also be connected to and between the front cover 25 and the base 21, and/or to and between the frame 24 and the base 21, so long as the shock-absorbing element 62 does not interfere with an opening of the base 21, via which the camera lens 31 is mounted into the base 21. The shock-absorbing element 62 may also be mounted between the base 21 and the front cover 25, the rear cover 26, and the frame 24.

Each of the elastic elements 28 includes a movable section, which is connected to the base 21, and an immovable section, which is connected to the front cover 25 or the rear cover 26, depending on a relative position of the elastic element 28 in the focusing structure 20. The shock-absorbing element 62 may also be connected to and between the elastic elements 28 and the front and/or the rear cover 25, 26 of the immovable mechanism 60. The shock-absorbing elements 62 provided at the above-mentioned positions act to absorb jitters produced by the base 21 when the same is displaced to a focused point and then stopped, so that the dynamic response time of the base 21 in focusing is suppressed.

Figure 7:
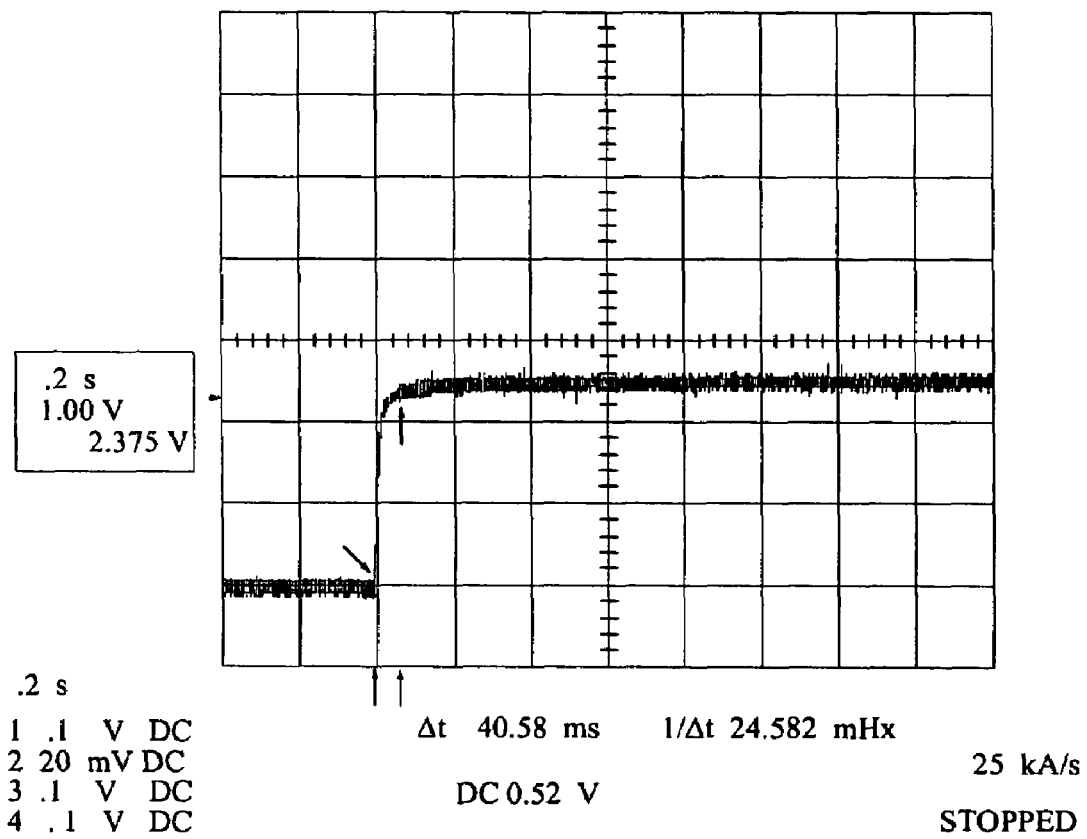
FIG. 7 shows a dynamic response waveform detected from the lens focusing structure with shock-absorbing elements according to the present invention.

FIG. 7 is a dynamic response waveform detected from the camera lens focusing structure 20 of the present invention provided with the shock-absorbing elements 62. As can be seen from FIG. 7, the base 21 is displaced to a focused point and then stopped in a completely stable state without any dynamic response time. It is therefore proved the method and structure of the present invention highly effectively suppresses the dynamic response time of the base 21 and accordingly, the camera lens 31 mounted in the base 21, during the focusing operation thereof.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A method of suppressing dynamic response time of lens focusing structure, the lens focusing structure including an immovable mechanism and a movable mechanism displaceable along a movement axis relative thereto, the method comprising the steps of:

connecting at least one shock-absorbing element to and between the movable and the immovable mechanisms, the shock-absorbing element being radially offset from the movement axis; and using the at least one shock-absorbing element to absorb jitters produced by the movable mechanism when the latter is displaced to a focused point and then stopped, so as to suppress dynamic response time of the movable mechanism for going from a moving state back to a still state.

2. The method of suppressing dynamic response time of lens focusing structure as claimed in claim 1, further comprising the following step before the step of connecting the at least one shock-absorbing element:

providing at least one receiving space between the movable and the immovable mechanism for mounting the at least one shock-absorbing element therein.

3. The method of suppressing dynamic response time of lens focusing structure as claimed in claim 1, wherein the at least one shock-absorbing element is selected from the group consisting of soft gel, soft spring, and soft rubber material.

4. The method of suppressing dynamic response time of lens focusing structure as claimed in claim 1, wherein the movable mechanism includes a base; and the base having a camera lens centered therein, and a winding externally wound therearound.

5. The method of suppressing dynamic response time of lens focusing structure as claimed in claim 1, wherein the immovable mechanism includes a frame with magnetic members mounted to four sides thereof, a front cover, a rear cover, and a housing enclosing the frame, the front cover, and the rear cover therein; and the movable mechanism being centered in the frame.

6. The method of suppressing dynamic response time of lens focusing structure as claimed in claim 1, wherein at least one elastic element is connected to and between the movable mechanism and immovable mechanism; the elastic element including a movable section connected to the movable mechanism and an immovable section connected to the immovable mechanism; and the at least one shock-absorbing element being connected to and between the movable section of the elastic element and the immovable mechanism.

7. A lens focusing structure capable of suppressing dynamic response time thereof, comprising:
   a movable mechanism including at least one base, which has a camera lens centered therein and a winding externally wound therearound;
   an immovable mechanism including at least a frame with magnetic members mounted to four sides thereof, a front cover, and a rear cover; and the movable mechanism being centered in the frame to be displaceable along a movement axis relative thereto; and
   at least one shock-absorbing element radially offset from the movement axis, the shock-absorbing element being connected to and between the movable and the immovable mechanisms for absorbing jitters produced by the movable mechanism when the latter is displaced to a focused point and then stopped, so as to suppress dynamic response time of the movable mechanism for going from a moving state back to a still state.

8. The lens focusing structure capable of suppressing dynamic response time thereof as claimed in claim 7, further comprising at least one receiving space provided between the movable and the immovable mechanism for mounting the at least one shock-absorbing element therein.

9. The lens focusing structure capable of suppressing dynamic response time thereof as claimed in claim 8, wherein the at least one receiving space is provided on one of the front and the rear cover.

10. The lens focusing structure capable of suppressing dynamic response time thereof as claimed in claim 7, wherein the at least one shock-absorbing element is selected from the group consisting of soft gel, soft spring, and soft rubber material.

11. The lens focusing structure capable of suppressing dynamic response time thereof as claimed in claim 7, further comprising at least one elastic element, which includes a movable section and an immovable section; the movable section being connected to the movable mechanism, and the immovable section being connected to the immovable mechanism; and the at least one shock-absorbing element being connected to and between the movable section of the elastic element and the immovable mechanism.

12. The method of suppressing dynamic response time of lens focusing structure as claimed in claim 1, wherein a plurality of said elastic elements are disposed about the movement axis to be angularly spaced one from the other thereabout.

13. The lens focusing structure capable of suppressing dynamic response time thereof as claimed in claim 7, comprising a plurality of said elastic elements disposed about the movement axis to be angularly spaced one from the other thereabout.

* * * * *